Figure 1:
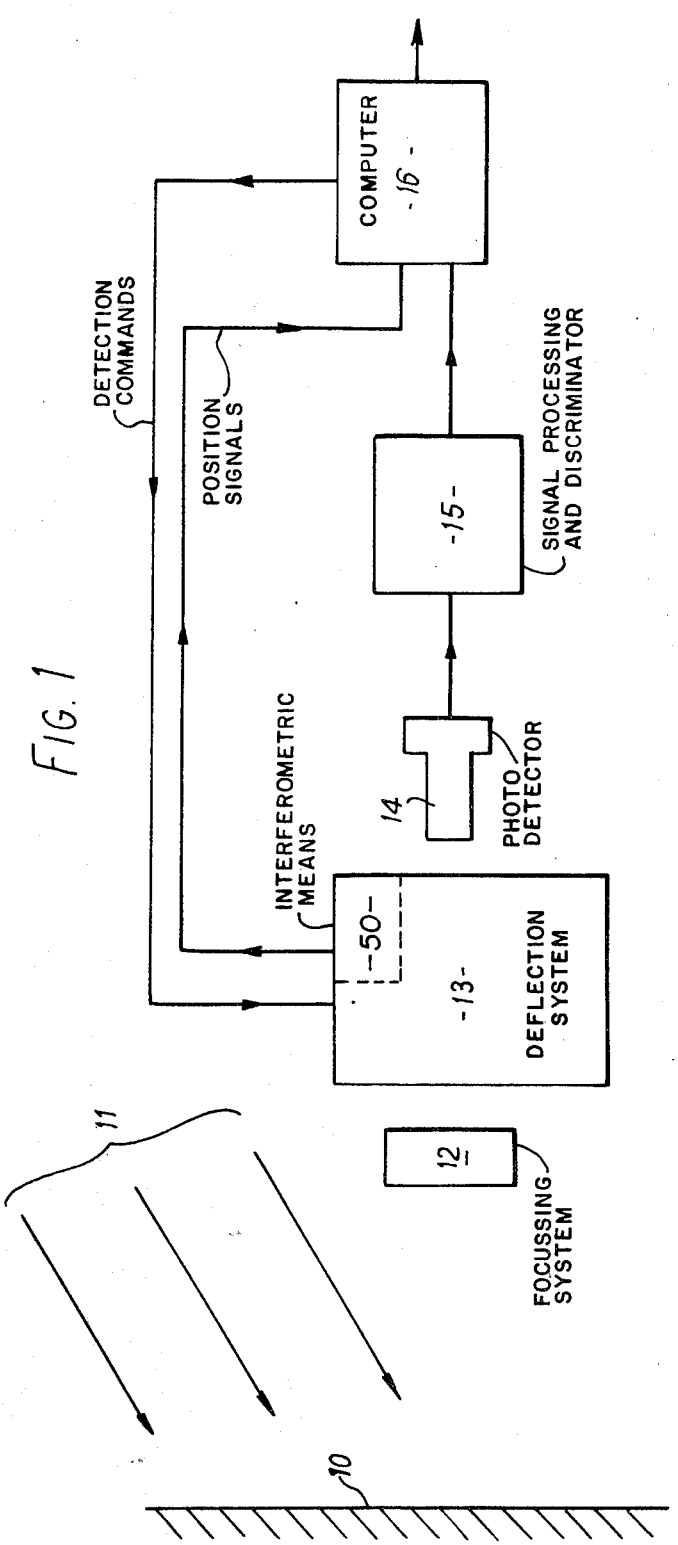

United States Patent [19]

Woodsford et al.

[11] 4,302,681
[45] Nov. 24, 1981

[54] OPTO-ELECTRONIC READING APPARATUS

[75] Inventors: Peter A. Woodsford; Beverley M. Ewen-Smith, both of Cambridge, England

[73] Assignee: Laser-Scan Laboratories Limited, Cambridge, England

[21] Appl. No.: 113,427

[22] Filed: Jan. 18, 1980

[30] Foreign Application Priority Data

Jan. 29, 1979 [GB] United Kingdom ............... 03059/79

[51] Int. Cl.³ .............................................. H04N 1/10
[52] U.S. Cl. ................................... 250/556; 250/234; 358/285; 358/293
[58] Field of Search ................ 358/285, 293; 250/556, 250/234

[56] References Cited

U.S. PATENT DOCUMENTS 4,220,976 9/1980 Rhyins et al. ....................... 358/293

Primary Examiner—David C. Nelms
Assistant Examiner—Darwin R. Hostetter
Attorney, Agent, or Firm—Blanchard, Flynn, Thiel, Boutell & Tanis

[57] ABSTRACT

An apparatus for reading information and converting it into digital data comprises an illuminating means which illuminates a source document (10), an optical system (12) which enables light from different parts of the document to be focussed at a photoelectric detector (14) and a deflection system (13) which directs light from different parts of the document (10) into the detector (14). The optical system (12) comprises a concave lens which converts the source document into a smaller, curved image which can be scanned by the apparatus, and a doublet lens with two elements whose separation is varied by a control device (16) so as to compensate for variations in the distance of the document from the detector (14). The deflection system (13) is also directed by the control device (16) which may cause it to follow lines on the document (10) or to perform a raster scan. Signals from the detector (14) are passed to a signal processor (15) which converts them to digital form.

18 Claims, 6 Drawing Figures

| SURFACE | RADIUS mm | THICKNESS-SEPARATION mm | MATERIAL | REFRACTIVE INDEX AT 441·6 nm |
|---|---|---|---|---|
| 31 | −528·32 ± 1·5 | | | |
| | | 10·0 ± 0·2 | LaKN12 | 1·69230 ± ·001 |
| 32 | 446·2 ± 5·0 | | | |
| | | 20·0 ± 0·2 | LLF1 | 1·56241 ± ·001 |
| 33 | −298·2 ± 3·0 | | | |
| | | 10·0 ± 0·2 | LaKN12 | 1·69230 ± ·001 |
| 34 | 1552·0 ± 10·0 | | | |

OPTO-ELECTRONIC READING APPARATUS

The present invention relates to opto-electronic apparatus for reading information from a source document and converting the information into electrical signals.

Existing opto-electronic reading apparatus is designed to convert the information into digital signals suitable for processing in a computer and is therefore commonly called a digitizer. The known apparatus uses a source document in the form of a photographic negative which is scanned by means of a laser beam. The light transmitted by different parts of the negative passes to a photo-electric detector which generates the information signals. Alternatively it would be possible to detect light reflected from an opaque source document.

The known apparatus suffers from the disadvantage that only records of a limited size can be scanned both because large deflections of the scanning beam involve optical distortions which have then to be corrected and because the collection of light from a large area onto a photo-electric detector is difficult. Thus with the known apparatus it is necessary with any large documents to make a reduced photographic negative for use in the apparatus. This additional step increases the difficulty and expense of the process and inevitably introduces some degradation of the information in the original record.

In accordance with the present invention there is provided an opto-electronic reading apparatus comprising a light source arranged to illuminate a document disposed in a document holder, a photo-electric detector to receive light reflected or transmitted by such a document; there being between the document holder and the detector, a deflection system to direct light from various areas of the document holder into the detector, an optical system to produce a focussed image of the document holder at the detector, a control device connected so as to control the angle through which the deflection system deflects the light entering the system and hence, to control the area of the document holder from which light enters the detector, and a signal processor unit arranged to receive signals from the detector and to transform them into digital data.

The problem of directing the light onto the detector does not arise in such a system because, in effect, the optical path has been reversed and the detector takes the place of the laser. The function of the deflection system is now to change the direction from which light reaches the detector. The apparatus can read documents of small sizes without difficulty and the size of the document can be increased by modifications to the optical system up to AO size. A significant advantage of the apparatus in accordance with the invention is that the document is illuminated over a substantial area, in some cases over the whole of the document, and can be examined and marked by the operator while the apparatus is in use. This is in contrast to any system in which a document is being scanned by a laser beam and the light collected by a photo-detector, because such a system requires all extraneous light to be excluded in order to avoid swamping the laser light at the detector.

Figure 2:
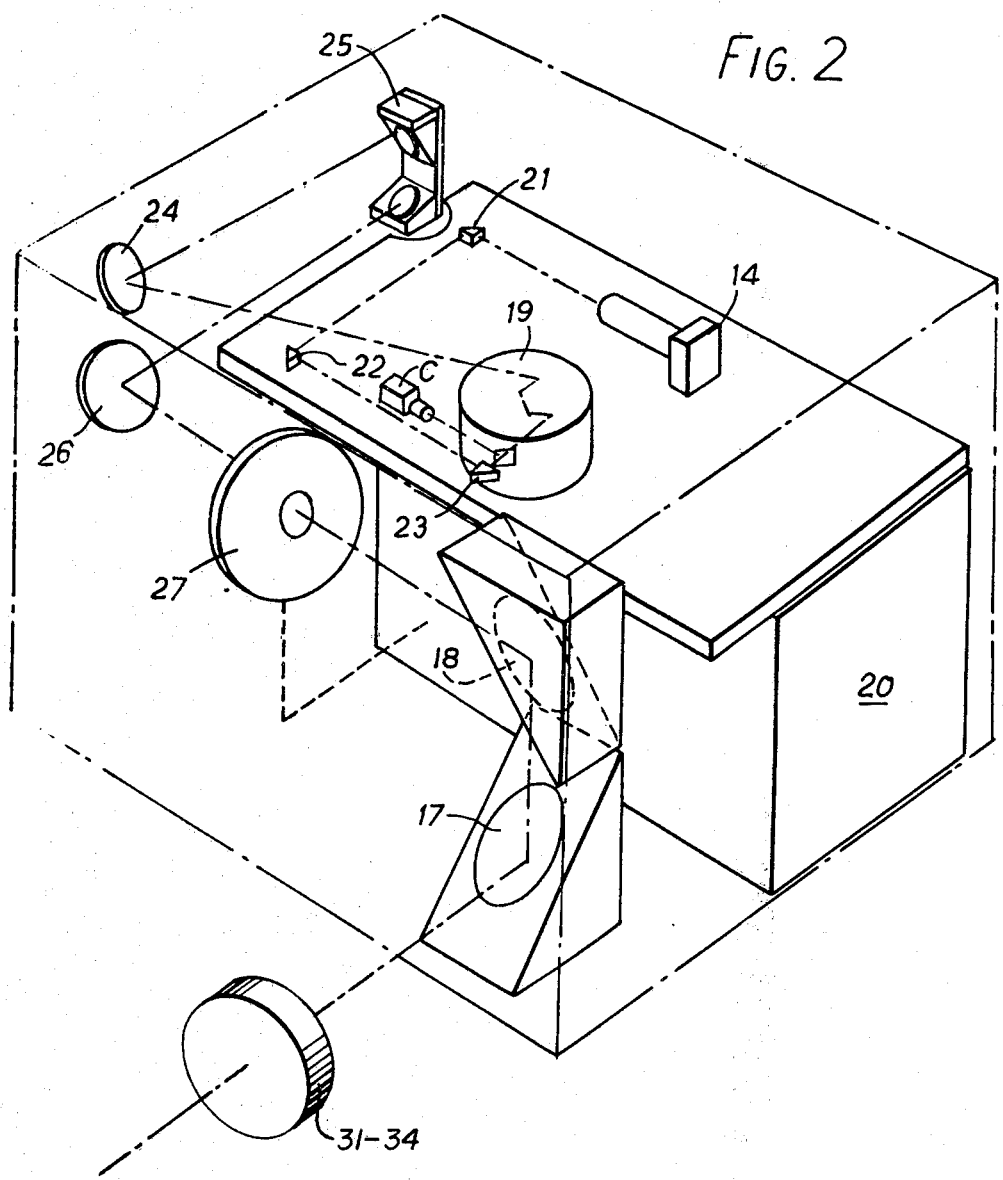
Figures 3, 4:
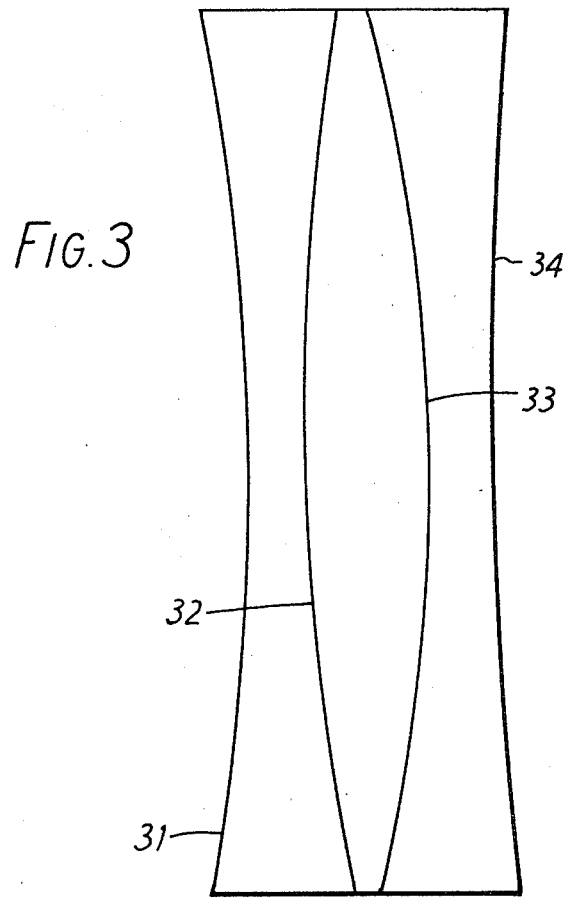
Figure 5:
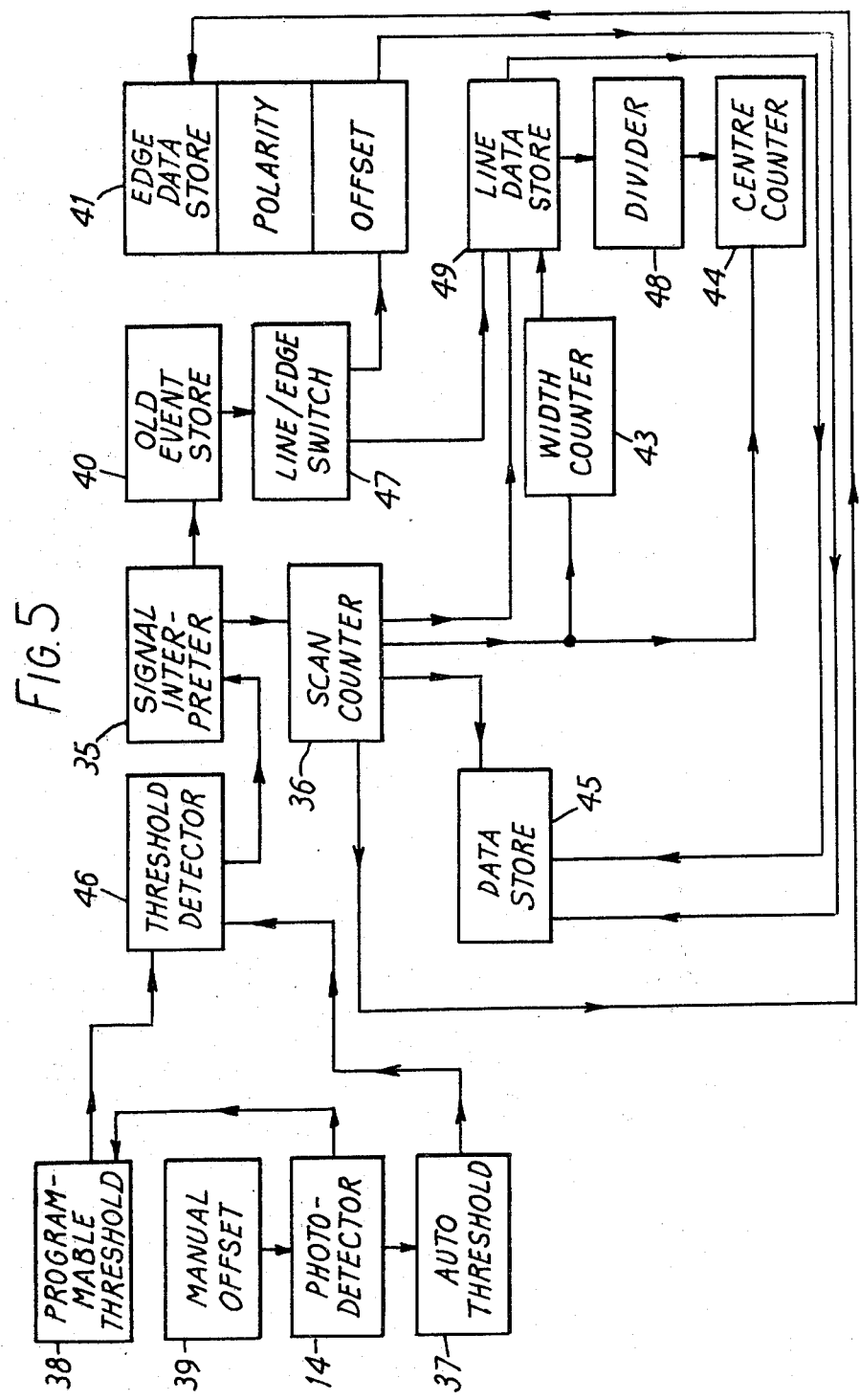
Figure 6:
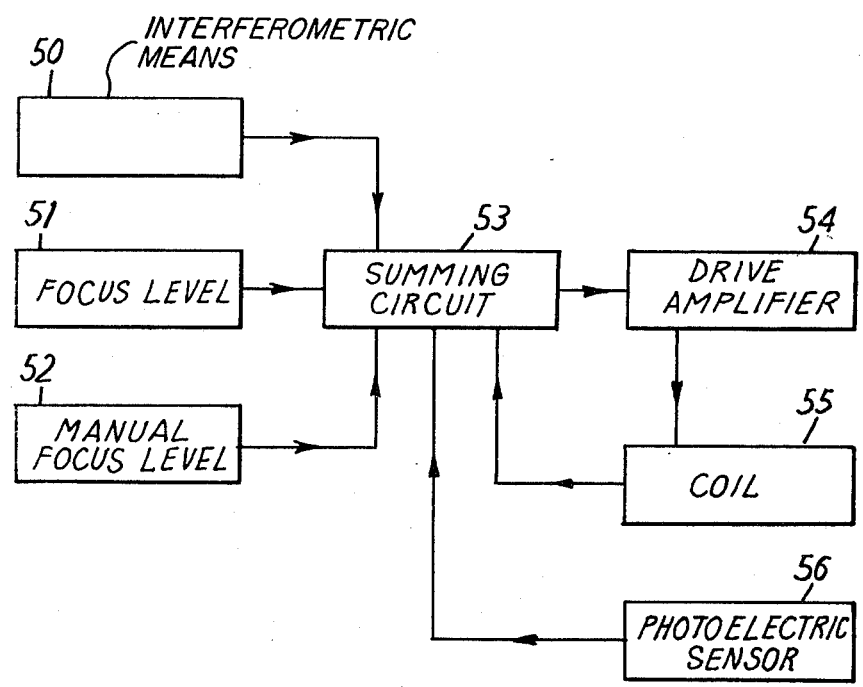

The invention will now be described in more detail with the aid of an example illustrated in the accompanying drawings, in which:

FIG. 1 is a block diagram of opto-electronic reading apparatus in accordance with the invention, FIG. 2 is a schematic diagram of the deflection system for the apparatus of FIG. 1, FIG. 3 is a side view of a cemented triplet lens, FIG. 4 is a table giving characteristics of the triplet lens and the materials used in its manufacture, FIG. 5 is a block diagram of the discriminator and signal processing unit, and FIG. 6 is a block diagram of the dynamic focus unit.

The apparatus shown in FIG. 1 is intended for reading a large document, upto AO size, for example a map or drawing. This source document is shown at 10 in FIG. 1 and is exposed to general illumination 11. In order to obtain the required intensity of illumination in the area which is being read it may be preferable to illuminate only a part of the document at any one time and to traverse the illuminated area over the document as the reading of the document progresses. The light reflected from the document 10 passes through a focussing system 12 and a deflection system 13 to a photo-detector 14. Electrical signals from the photo-detector 14 pass to a signal processing and discriminator unit 15 whch feeds signals to a computer 16. The computer 16 issues deflection commands to the deflection system 13 and receives position signals from the deflection system indicating the point on the source document from which at any instant light is reaching the photo-detector and giving rise to the signals reaching the computer from the unit 15. The computer 16 supplies digital data representing the information content of the source document and this information can be recorded or passed to a further processing unit.

The deflection system 13 and its control arrangements are based on the described in U.S. Pat. No. 3,896,362 but whereas the U.S. Pat. describes a system for deflection of a laser beam to scan a document for reading or writing purposes, the system here shown controls the direction from which the photo-detector 14 receives light and only uses a laser beam for control of the position of the deflection mirrors.

Referring to FIG. 2 it will be seen that the deflection system 13 includes a pair of main steering mirrors 17 and 18 for deflection in X and Y co-ordinate directions and a secondary deflection device 19, which may be of the kind described in U.K. Patent Specification No. 1,394,570 which comprises a pair of very small suspended mirrors for the X and Y deflections. The control of the position of the mirrors 17 and 18 and the correction of errors in that position by the device 19 are effected as described in U.S. Pat. No. 3,896,362 and the electronic circuits for this purpose are housed in an enclosure 20 on top of which the photo-detector 14 is mounted. In summary, the position of each of the mirrors 17 and 18 is measured by means 50 including an interferometer operating with a laser beam. The interference fringes are detected by photo-diodes and the signals from the diodes are used by the electronic circuits to measure the mirror positions, which are compared with the positions commanded in order to generate an error signal for servo-control of the mirrors. Instantaneous differences between the desired and actual positions of the main mirrors are corrected by the secondary deflection system which is controlled by the same error signal and operates at high speed over a limited range of angles.

The path of light through the system is of course from the source document to the photo-detector but it is convenient to consider the optical path in the opposite direction, starting from the detector 14. The optical path then proceeds by way of three internally-reflecting prisms 21, 22 and 23 to the secondary deflection system 19. From here the path is by way of a fixed mirror 24, a movable pair of mirrors 25, another fixed mirror 26, and an adjustable focus lens 27 to the main mirrors 17 and 18. The movable mirrors 25 allow for coarse adjustment of the image distance in accordance with the position at which the source document is to be placed. The adjustable focus lens 27 is a servo-driven doublet controlled by an analogue computing network which dynamically corrects for image distance changes as the source document is scanned. The doublet 27 has two lens elements whose separation can be varied in order to adjust the doublet's overall focal length and correct for the varying image distance. The deviation from the axis of the apparatus, in the vertical and horizontal directions, of the direction from which light is currently being receved is measured by interferometric means 50, as described in U.S. Pat. No. 3,896,362, applied to the main steering mirrors 17 and 18. A signal proportional to the square of the distance from the axis of the direction currently being scanned is combined by a summing circuit 53 (see FIG. 6) with a data signal 51 which carries information on the actual level of focus and also with a voltage derived from a potentiometer 52 on the control panel of the apparatus which indicates the manual focus level. This summing circuit 53 provides a focus control voltage which is applied to a drive amplifier 54 which produces the current needed to drive the coil 55 used to vary the separation of the two lens elements.

Feedback is derived from two sources, the current in the coil 55 and from a photoelectric sensor 56 in the lens assembly which produces feedback proportional to the lens separation. This feedback ensures that the correct movements of the lens elements takes place. This is necessary because the source document is flat and when looking at points away from the centre of the document the optical path is longer.

For convenience and clarity of exposition FIG. 1 shows the focussing system 12 separate from the deflection system 13 but it will be appreciated from the foregoing that they are in practice at least partly combined. For large source documents it is necessary to provide between the document and the main deflection mirrors an imaging lens which takes the form of a negative or concave lens of large aperture which is a specially designed cemented triplet lens. This lens is shown in FIG. 3 and consists of three parts cemented together. Details of its dimensions and the materials used in its manufacture are given in the table shown in FIG. 4. The imaging lens has the effect of transforming the source document of AO size on a flat surface into a curved virtual image of A6 size which is then scanned by the main deflection mirrors. The curvature of the image compensates partially for the change in optical path length as different parts of the image are scanned. The adjustable focus lens 27 completes the necessary compensation.

The description so far has assumed that the source document is opaque and is illuminated from the front and read by reflected light. It is also possible with a transparent or translucent document to illuminate it from below and use the transmitted light for reading. Whereas it would be possible to use overall illumination of the document with white light or a broad range of wavelengths it may prove preferable to use a restricted range of wavelength to aid discrimination between wanted signals and the general background illumination. It may also be necessary, as mentioned previously, to provide more intense illumination over a limited area of the document and couple movement of the illuminated area with the movement of the point being read by the apparatus, for example by using signals from the deflection system.

For reading of maps and diagrams the apparatus operates in a line following mode, using a localized zig-zag or to and fro scan pattern superimposed on a straight line movement. Initially the operator sets the starting point and the direction of movement but thereafter the computer changes the direction of follow a line on the diagram in accordance with information received as the zig-zag scan crosses and re-crosses the line on the diagram. The unit 15 receives a constantly changing light input from the detector 14, resulting, inter alia, from changes in overall illumination, differences in reflectivity of different parts of the document, changes in the angle at which the document is examined, and intervention of extraneous light sources or shadows and is designed to look only for the sharp change in light input as the scan crosses a line. If the apparatus is operated in a raster scan mode, the photodetector 14 produces a large negative pulse at the beginning of each scan and a signal interpreter 35 (see FIG. 5) responds by activating a scan counter 36 which produces a digital indication of the direction from which light enters the photodetector 14. As the scan continues further pulses are produced by the photodetector 14 and the signal processing unit 15 must decide which of these pulses are valid ie which pulses arise from genuine light-dark edges and which arise from random variations in the intensity of the light reaching the photodetector.

There are two criteria which may be applied in order to determine whether or not a given pulse is valid. The pulse is initially amplified and compared to an automatic threshold level 37. It is also compared to a programmable threshold 38. This programmable threshold 38 is designed to take into account the variation in light intensity at the photodetector due to the varying angle from which the light originates. Either the automatic 37 or the programmable threshold 38 is selected 46 to give the signal indicating the true change in light intensity. The subtraction of the threshold level in effect removes any background light which may be present so as to improve the resolution of the information stored. In order to enable fine adjustments to be made to the resolution, the apparatus includes a manual offset control 39 which allows the operator to add or subtract a variable d.c. level to the incoming pulses until an optimum degree of resolution is achieved.

There are five possible signals which are input by the photodetector into the signal interpreter; these are START SCAN, END SCAN, START ENCOUNTER, END ENCOUNTER and OVER LIMIT. The first of these, as explained above, takes the form of a large negative pulse which activates the scan counter 36. The OVER LIMIT signal occurs when a signal is compared to a preset upper limit and found to be greater than it, such signals are again ignored by the signal interpreter 35 and are assumed to be spurious.

The unit has two different modes of operation, a 'line' mode and an 'edge' mode chosen by means of a switch 47. In both modes of operation, the arrival of a signal at the signal interpreter 35 causes the information about the last previous signal to be transferred to an 'old' event store 40 so that each signal is considered and interpreted in conjunction with the last previous signal received. In 'edge' mode, the START ENCOUNTER and END ENCOUNTER signals indicate edges of different polarities ie either white-to-black or black-to-white. Information on the position of the edge, given by the scan counter 36, and on its polarity is transferred to an edge data store 41. Information on all edges encountered is stored until an END SCAN signal, a second large negative pulse, is received by the signal interpreter 35, at which point all the data arising from that scan is sent in digital form to a permanent store 45.

In 'line' mode a START ENCOUNTER signal causes the signal interpreter 35 to activate width 43 and centre counters 44. The width counter 43 counts from the START ENCOUNTER signal to the END ENCOUNTER signal and produces a digital value for the line width in units of four machine counts. The centre counter 44 is activated by the signal interpreter 35 when a START ENCOUNTER signal is received and continues to count at half-speed by means of a divider 48 until the END ENCOUNTER signal so that the position of the centre of the line and its width are stored in the line data store 49.

Information arising from START ENCOUNTER signals not followed by an END ENCOUNTER signal or from END ENCOUNTER signals not preceded by a START ENCOUNTER signal is treated as edge information.

The width information is compared with preset upper and lower limits in order to check that the line is valid and then the line data is sent to the permanent data store 45.

The apparatus may also, as mentioned above, be operated in a line following mode.

As an alternative to the line-following mode the apparatus may operate in a raster scan mode using the localized zig-zag pattern but executing it in a regular way over the source document under automatic control without regard to the information received as the scan takes place.

To show the operator the path being followed in the course of reading of the document it is possible to use a beam of light directed through the optical system towards the document in order to produce a spot of light on the document at the point to which the deflection system is directed and from which light is reaching the photodetector. Conveniently this pointer beam can be generated by a low power laser.

Alternatively, it is possible to use a television camera in the deflection system to give a close-up view of the part of the document which is currently being scanned. the camera tube is arranged so that it receives a small part of the light in the real image plane between the prism 23 and the small mirror 19 shown in FIG. 2.

We claim:

1. An opto-electronic reading apparatus comprising a light source arranged to illuminate a document disposed in a document holder a photo-electric detector to receive light reflected or transmitted by such a document, there being between the document holder and the detector a deflection system to direct light from various areas of the document holder into the detector and an optical system to produce a focussed image of the document holder at the detector, the apparatus also comprising a control device connected so as to control the angle through which the deflection system deflects light entering the system and hence, to control the area of the document holder from which light enters the detector, and a signal processor arranged to receive signals from the detector and to transform them into digital data.

2. An apparatus as claimed in claim 1 in which the deflection system comprises a primary deflecting means and a secondary deflection means having a higher speed of response than the primary deflecting means.

3. An apparatus as claimed in claim 2 in which the primary deflecting means comprises two movable mirrors arranged to deflect the light received in two perpendicular planes.

4. An apparatus as claimed in claim 2 in which the secondary deflecting means comprises two suspended mirrors, rotatable about parallel axes, and having between them a device which rotates the plane in which light is deflected by the first mirror through an angle of 90°.

5. An apparatus as claimed in claim 2 which comprises a servo-system arranged to control the deflection system by means of error signals derived from a comparison of the actual measured position of the deflection system and the position towards which it is currently being directed by the control device.

6. An apparatus as claimed in claim 5 in which the same error signals are used to control both the primary and secondary deflection means.

7. An apparatus as claimed in claim 2 which comprises a servo-system arranged to control the deflection system by means of error signals derived from a comparison of the actual measured position of the deflection system and the position towards which it is currently being directed by the control device, the same error signals being used to control both the primary and secondary deflection means.

8. An apparatus as claimed in claim 5 comprising a laser, an interferometric system mounted on the primary deflecting means and a secondary photo-electric detector arranged to receive light from the interferometic system and to pass signals indicating the actual position of the deflecting means to the control device.

9. An apparatus as claimed in claim 1 in which the control device generates position command signals to be passed to the deflection system in response to signals representing information from the source document.

10. An apparatus as claimed in claim 9 in which the position command signals generated by the control device cause lines on the document to be followed by the deflection system.

11. An apparatus as claimed in claim 9 in which the position command signals generated by the control device cause the deflection system to be directed at a succession of points whose locus has the form of a raster scan over small areas of the document holder.

12. An apparatus as claimed in claim 1 comprising a light source which produces a beam of light directed through the deflection system towards the document holder, producing a light spot on the document holder in the area from which light is being received by the detector.

13. An apparatus as claimed in claim 1 which comprises a television camera arranged to receive a small part of the light passing through the apparatus and a monitor on which a close-up picture of the document is produced by the camera.

14. An apparatus as claimed in claim 1 in which the optical system comprises two movable lens elements whose separation is controllable by means of a servo-system which is connected so as to receive signals indicating the position of the deflection system and to vary the separation of the lens elements to compensate for variations in the distance between the document and the detector.

15. An apparatus as claimed in claim 14 comprising a concave lens arranged in the path of light entering the deflecting means from the document holder the lens forming a smaller, curved image of the document in the holder from which light enters the apparatus.

16. An apparatus as claimed in claim 1 in which said light source is arranged to illuminate only that part of the document holder from which light is currently entering the deflection system.

17. An opto-electronic reading apparatus comprising:
a document holder;
a light source arranged to illuminate a document disposed in the holder;
a photo-electric detector to receive light reflected or transmitted by such a document;
a deflection system disposed in the light path between the document holder and the detector, the system being constructed to deflect light in two nonparallel planes;
drive means coupled to the deflection system to vary the angle of deflection in each of the two planes, and hence, to vary the coordinates of the area of the document from which light enters the detector;
a control device acting on the drive means so as to cause the deflection system to steer light from successive areas of the document having differing coordinates into the detector; and
a signal processor arranged to receive signals from the detector and transform them into digital data.

18. An apparatus as claimed in claim 16, including an optical system to produce a focused image of the document holer of the detector.

* * * * *